United States Patent
Nguyen et al.

(10) Patent No.: US 11,351,701 B2
(45) Date of Patent: Jun. 7, 2022

(54) INDUSTRIAL COMPOSITE MANUFACTURING METHOD

(71) Applicant: VIETTEL GROUP, Ha Noi (VN)

(72) Inventors: Anh Vu Nguyen, Hanoi (VN); Trong Dai Vu, Ha Noi (VN); Ky Nam Pham, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 181 days.

(21) Appl. No.: 16/554,284

(22) Filed: Aug. 28, 2019

(65) Prior Publication Data
US 2020/0078991 A1 Mar. 12, 2020

(30) Foreign Application Priority Data
Sep. 6, 2018 (VN) .............................. 1-2018-03933

(51) Int. Cl.
*B29C 35/08* (2006.01)
*B29C 70/48* (2006.01)

(52) U.S. Cl.
CPC .......... *B29C 35/0805* (2013.01); *B29C 70/48* (2013.01); *B29C 2035/0855* (2013.01)

(58) Field of Classification Search
CPC ................ B29C 70/48; B29C 35/0805; B29C 2035/0855; B29C 64/1425; B29C 65/1425; B29C 2045/0075; B29C 59/16; B29C 65/14; B29C 71/04; B29C 43/00; B29C 43/006; B29C 2043/147; B29C 43/183; B29C 43/184; B29C 43/56
See application file for complete search history.

(56) References Cited

U.S. PATENT DOCUMENTS

| | | | |
|---|---|---|---|
| 5,518,385 A * | 5/1996 | Graff | B29C 70/48 425/127 |
| 5,686,038 A | 11/1997 | Christensen et al. | |
| 2006/0233907 A1 * | 10/2006 | Ruiz | B29C 70/546 425/387.1 |
| 2014/0191447 A1 | 7/2014 | Chiu | |

* cited by examiner

*Primary Examiner* — Stella K Yi
(74) *Attorney, Agent, or Firm* — PatentTM.US

(57) ABSTRACT

The present invention proposes a method of industrial composite manufacturing. The method combines the resin transferring molding method with vacuum process and compression process in appropriate orders for achieving high quality products. In the curing process, microwaves are used to harden the plastic resin in the mold. Specifically, the main steps of the method are following: step 1: preparation of materials and equipment; Step 2: Disposition of the reinforced fibers/fabrics and mold closing at the extend position; Step 3: Vacuum and transfer plastic resin into the mold; Step 4: Mold closing by compression pressure; Step 5: Plastic resin curing by using a microwave system; Step 6: Open the mold and take the composite product.

4 Claims, 2 Drawing Sheets

INDUSTRIAL COMPOSITE MANUFACTURING METHOD

FIELD OF THE INVENTION

The present invention provides a method for manufacturing products made of composite materials in the industrial production scale.

BACKGROUND OF THE INVENTION

Composite materials have the advantages of mechanical properties such as high modulus, high strength and light weight. Therefore, they are increasingly used in the fields of aviation, spacecraft, automobiles, sport products and civil products.

For composite products used in high-tech fields like aviation and aerospace, they work under high loading conditions, strong vibration and high temperature, therefore they must satisfy strict requirements of quality such as high consistency, low porosity, good surface quality and accurate geometry (thickness and shape).

At the present, there are several methods to make composite products as:

Hand lay-up method, spray lay-up method: These methods are low-cost, not automated, suitable for production at small/medium scale and for products with low/medium quality control requirements;

Compression molding method and resin transfer molding method: in the compression molding method, the resin is injected into the mold within reinforced fibers/fabrics then the top mold is pressed down to form product shape. In the resin transfer molding method, a pressure force is used to pump the plastic resin into the mold within reinforced fibers/reinforced fabrics. These methods have automation abilities and can be applied for the production of large scales, but their product qualities are limited. Because air contacts directly with the resin in the mold during the resin transferring process and can go inside the resin, therefore it is difficult to control and reduce air-pore content in the products, especially for the products with complex shapes;

Compression resin transfer molding method is able to make composite products with higher quality, at large scale production. This method is similar to the resin transfer molding method. However, the top mold is set at larger position during the resin transferring period in order to facilitate the transferring resin flow and it is closed by compression loading after the mold is filled with resin.

Vacuum assisted resin transfer molding method (VARTM): VARTM is a variation of the resin transfer molding method with its distinguishing characteristic being the replacement of the top mold with a vacuum bag and the use of a vacuum process to assist in resin flow. The vacuum process removes air in the mold before resin transferring process and generate a pressure difference inside the mold and outside the vacuum bag. This pressure difference increases the resin flow and engenders a compression pressure on the vacuum bag. This method makes products with high quality of consistency. However, it is difficult to control accurately the product thickness;

Autoclave molding of pre-pregs: the method uses pre-impregnated fibers/fabrics as primary materials. After arranging pre-pregs fabric in the mold, the mold is put into a vacuum furnace for air vacuum and curing process. The method is very expensive in terms of primary material costs as well as machinery investment, so it is not suitable for the industrial production of large quantity scale;

Actually, there are two main measures for curing thermosetting plastic resin matrix:

Use curing additives to harden plastic resin matrix at normal temperature. However, the curing time of this method is quite long, so it is often used in small/medium scale productions;

Heating to accelerate the curing process of thermosetting plastic resin matrix. However, this method consumes time/energy for heating and cooling the mold. The high temperature of the mold causes a thermal deformation of the mold that could change the shape of the product. Currently, the heating process is the main method used for industrial composite production at large scale.

In addition, some composite manufacturing methods were registered as:

The invention in the patent US2014/0191447 provides a method for manufacturing composite materials by a combination of resin transfer molding method with a vacuum process before transferring plastic resin into the mold. The curing process of thermosetting plastic resin is accelerated by the heating process on the mold.

The U.S. Pat. No. 5,686,038A proposes a composite manufacturing method for plastic resin matrix emitting volatile gas during the curing period. This method is based on the resin transfer molding method combined with the vacuum process before transferring plastic resin into the mold. In the plastic resin curing process, the mold is firstly heated during 6 hours at 665° F., then press at 185 psi in 1 hour to push volatile gas away.

In order to improve the quality and quantity of industrial composite production, we propose the method of manufacturing composite materials based on the resin transferring molding method combined with vacuum process and compression process. In curing process, the plastic resin is cured by the application of microwaves.

SUMMARY OF THE INVENTION

The invention presents the composite manufacturing method that could be used in industrial production scale for obtaining high quality products. This method includes the following steps: Step 1: Preparation of materials and equipment; Step 2: Disposition of the reinforced fibers/fabrics and mold closing at the extend position; Step 3: Vacuum and transfer plastic resin into the mold; Step 4: Mold closing by compression pressure; Step 5: Plastic resin curing by using a microwave system; Step 6: Open the mold and take the composite product.

DESCRIPTION OF THE SPECIFIC EMBODIMENTS

The quality of composite materials is evaluated through many factors. One important factor is the consistency, low pore ratio in the composite structure improves the material strength, durability and resistance to dynamic loads. The curing degree of the plastic resin matrix also affects considerably to the composite product quality. A uniform curing of the resin matrix of composite materials allows a continuous force transmission in the composite structure. Another important factor is the geometric quality of the composite products. In the high-tech application, many composite products are required to have smooth surfaces as well as a precise thickness.

In order to satisfy all the quality requirements, the industrial composite manufacturing method proposed in this invention includes the following steps:

Step 1: Preparation of materials and equipment
Step 2: Disposition of the reinforced fibers/fabrics and mold closing at the extend position
Step 3: Vacuum and transfer plastic resin into the mold;
Step 4: Mold closing by compression pressure;
Step 5: Plastic resin curing by using a microwave system;
Step 6: Open the mold and take the composite product.

Figure 1:
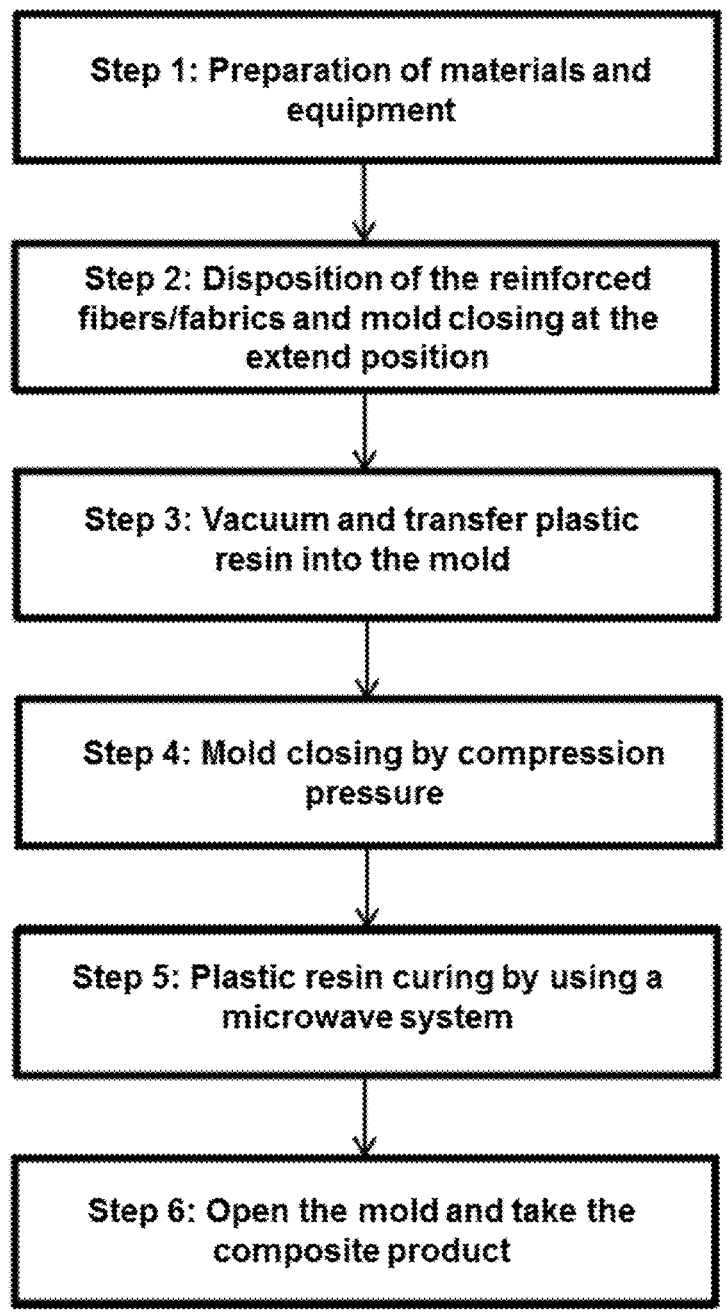
FIG. 1: Block diagram of the industrial composite manufacturing method
Figure 2:
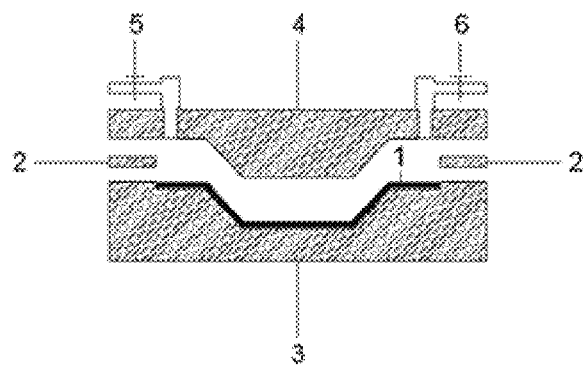
FIG. 2: Figure illustrating the second step of the method.

Specifically, the steps of the method are described as follows:

Step 1: Preparation of materials and equipment. Referring to FIGS. 1 and 2, necessary equipment and materials are prepared as follows:

Raw materials include plastic resin, reinforcing fibers/fabrics and additives;

Mold must made by non-conductive materials that is low affected by electromagnetic waves such as wood, concrete, porcelain, plastic . . . . Specifically, the mold is composed by: the interior surface (1) is designed as the shape of the product; the wedges (2) have the air insulation ability, help to keep the distance between bottom mold and upper mold and can be disassembled; bottom mold (3); upper mold (4); inlet valve (5); and outlet valve (6).

Main machines include vacuum pump, compressing machine and microwave system;

Other equipment: balance, resin tank, pipelines, valves, pressure gauges . . . .

Step 2: Disposition of the reinforced fibers/fabrics and mold closing at the extend position. Referring to the FIGS. 1 and 2, reinforcing fibers/fabrics (1) are arranged in the molds corresponding to the design. The fiber volume content and the fiber orientation are determined based on the design principles and the design standards to satisfy the load-bearing conditions of the product. After fibers/fabrics arrangement on the surface of the bottom mold, place the upper mold (4) at the extend position where the distance between the upper mold (4) and the bottom mold (3) is greater than the thickness of the product by at least 30%. The distance is held by the wedges (2) that have the air insulation ability. This extension creates more space for resin flow transferring into the mold.

Figure 3:
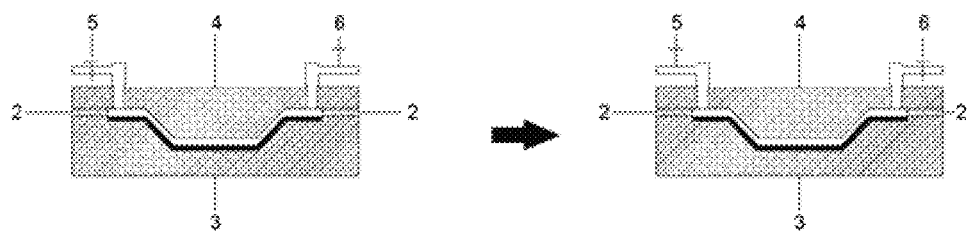
FIG. 3: Figure illustrating the third step of the method.

Step 3: Vacuum and transfer plastic resin into the mold. Referring to the FIG. 1 and FIG. 3, after the disposition of fibers/fabrics into the mold, the vacuum in the mold is carried out. Firstly, the inlet valve is closed (5); then the outlet valve (6) which connects the molds and the vacuum pump is opened; Start the vacuum pump machine in order to eliminate air in the mold. By using a pressure gauge measuring the pressure in the mold, it can be determined the moment when the mold interior reaches the vacuum state. After reaching the vacuum state, close the outlet valve (6), then turn off the vacuum machine. Then, the inlet valve (5) connected between the resin tank and the mold is opened to transfer the plastic resin into the mold until the plastic matrix resin fills the mold.

Figure 4:
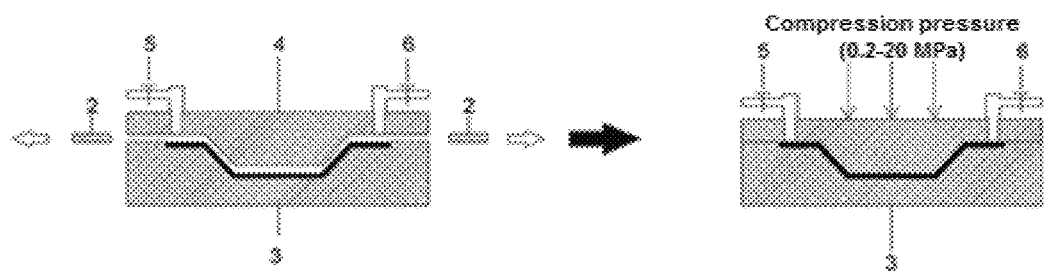
FIG. 4: Figure illustrating the fourth step of the method.

Step 4: Mold closing by compression pressure. Referring to the FIG. 1 and FIG. 4, after the plastic resin filled the mold, the wedges (2) are disassembled. Then, compression pressure is applied on the upper mold in order to push the excess plastic resin out and move the upper mold to the designed position corresponding to the designed thickness of the composite product. The pressing pressure on the upper mold is chosen from 0.2 MPa to 20 Mpa depending on the type of plastic resin and the shape of the product. It can be seen that the applied pressure in the method is 2-200 times greater than the pressure in the conventional VARTM method.

Figure 5:
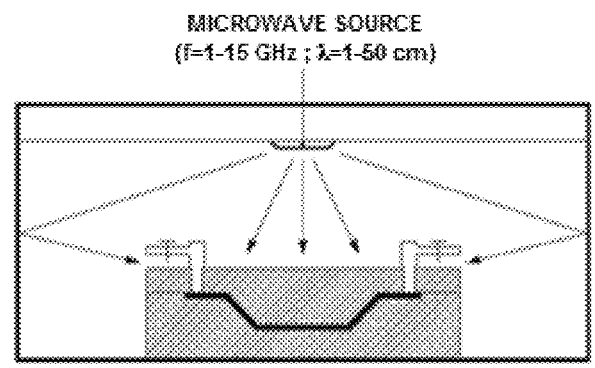
FIG. 5: Figure illustrating the fifth step of the method.

Step 5: Plastic resin curing by using a microwave system. Referring to FIG. 1 and FIG. 5, after the upper mold is closed at the product thickness position, the thermosetting resin in the mold is then cured by microwave, where the microwave frequency could be chosen from 1-15 GHz, and the wavelength can be from 1 to 50 cm. By using the curing microwave system, the entire product can be cured at the same time. The curing time depends on the size, thickness and type of used plastic resin.

Step 6: Open the mold and take the composite product. After the curing process, keep the mold during at least 30 minutes for cooling, then open the mold to get the product.

In the method, the two surface sides of the product are in contact with two solid surfaces of the mold. Therefore, two surfaces of the products are smooth, and the thickness of the product can be accurately controlled according to the designed thickness. The consistency of the composite products is also high due to the effects of two processes: the vacuum process in the mold and the compressing process with pressure 2-200 times higher than conventional compression pressure in the VARTM method. Finally, the curing process could be faster and more energy saving, because by using microwaves, energy could be quickly transmitted for curing the plastic resin matrix. The method of the present invention could be automated at high level with medium investing cost. Especially, with time saving in the curing process, the method could improve the productivity of the manufacturing unit.

We claim:

1. An industrial composite manufacturing method comprising the following steps:

Step 1: Preparation of materials and equipment; said preparation comprising preparing necessary materials and equipments including: a mold set comprising upper and lower molds, reinforced fibers/fabrics, plastic resin, additives, vacuum pump, compression machine, microwave system and other tools;

Step 2: Disposition of the reinforced fibers/fabrics and mold closing at an extended position; the reinforced fibers/fabrics are arranged in the mold, then an upper mold is set at an extended position to make space (at least 30%) for the plastic resin by using wedges with air-insulation ability;

Step 3: Vacuum and transfer plastic resin into the mold; comprising, after vacuuming air inside the mold, the plastic resin is transferred into the mold;

Step 4: Mold closing by compression pressure; comprising, disassembling the wedges and then the upper mold is closed at a designed position by using a compression pressure;

Step 5: After the mold closing by compression pressure step, plastic resin curing by using a microwave system; the plastic resin is cured by using microwave system; and Step 6: Open the mold and take the composite product; after curing process, the mold is firstly cooled, then is opened to take out the composite product.

2. The industrial composite manufacturing method according to the claim 1, wherein in the Step 2, the upper mold is firstly closed at the extended position where the distance between the upper mold and the lower mold is set greater than a thickness of the composite product by at least 30%.

3. The industrial composite manufacturing method according to claim 1, wherein in the Step 4, the compression pressure is applied to the mold set in order to push an excess plastic resin out and move the upper mold to a position corresponding to a designed thickness of the composite product; the compression pressure process takes place immediately after the plastic resin fills the mold; the value of the compression pressure is taken from 0.2-20 Mpa.

4. The industrial composite manufacturing method according to claim 1, wherein in the Step 5, thermosetting resin in the mold is hardened by a microwave with frequency from 1-15 GHz and wavelength from 1-50 cm.

* * * * *